US005472585A

United States Patent [19]
Dinella et al.

[11] Patent Number: 5,472,585
[45] Date of Patent: Dec. 5, 1995

[54] REGENERATION OF SPENT ELECTROLESS COPPER PLATING SOLUTION

[75] Inventors: Donald Dinella, Berkeley Heights; Sudarshan Lal, Glen Rock; David A. Nicol, Trenton, all of N.J.

[73] Assignee: AT&T Corp., Murray Hill, N.J.

[21] Appl. No.: 346,949

[22] Filed: Nov. 30, 1994

[51] Int. Cl.$^6$ .................................................. B01D 61/44
[52] U.S. Cl. .............................. 204/182.4; 204/DIG. 13; 427/98
[58] Field of Search ................ 204/182.4, DIG. 13; 427/98

[56] References Cited

U.S. PATENT DOCUMENTS 4,199,623  4/1980  Nuzzi et al. ........................ 427/305
4,324,629  4/1982  Oka et al. .......................... 204/182.4
4,805,553  2/1989  Krulik ................................. 118/603
5,091,070  2/1992  Bauer et al. ....................... 204/182.4

OTHER PUBLICATIONS

"Selemion Ion–Exchange Membranes," product literature of *Asahi Glass Co., Ltd.* (1992), pp. 3–18.

Primary Examiner—John Niebling
Assistant Examiner—Arun S. Phasge
Attorney, Agent, or Firm—Lester H. Birnbaum

[57] ABSTRACT

Disclosed is a method for removal of contaminants and replenishment of an electroless copper plating solution in order to allow reuse of the solution. Copper oxide is dissolved in the spent solution and this is followed by an electrodialysis which removes formate and carbonate ions.

10 Claims, 2 Drawing Sheets

REGENERATION OF SPENT ELECTROLESS COPPER PLATING SOLUTION

BACKGROUND OF THE INVENTION

This invention is related to an electroless copper plating process.

Electroless copper plating is a significant step in the fabrication of printed circuit boards. One of the problems with the electroless plating process is a significant build-up of contaminants such as formate and carbonate ions which are detrimental to copper plating quality and bath stability. One approach to this problem is simply to replace the bath with a new one after several plating cycles (each typically 24 hours). Not only is such an approach expensive, it creates serious waste disposal problems. In present and future factory processes, it is far more desirable, if not mandatory to meet EPA regulations, to replenish the existing baths and eliminate the need to discard any material which could be harmful to the environment.

In order to replenish electroless copper baths, it has been suggested to use electrodialysis apparatus to remove a variety of contaminants therefrom. (See, e.g., U.S. Pat. No. 4,805,553 issued to Krulik, and U.S. Pat. No. 5,091,070 issued to Bauer et al.) In practice, it has been extremely difficult to apply electrodialysis such that the resultant wash is not compromised by the addition of contaminants which cannot be easily disposed of, or the subsequent use of the plating solution does not adversely affect the final product.

SUMMARY OF THE INVENTION

The invention is a method for deposition of copper on an insulating substrate utilizing an electroless copper plating bath in a plating tank. The method involves removing a portion of the bath from the tank and adding copper oxide in order to replenish copper used up during the plating. Subsequently, the portion of the bath is transported to an electrodialysis apparatus to remove contaminants therefrom, and the resulting portion of the bath is removed to the plating tank.

BRIEF DESCRIPTION OF THE DRAWING

These and other features of the invention the delineated in detail in the following description. In the drawing.

It will be appreciated that for purposes of illustration, these figures are not necessarily drawn to scale.

DETAILED DESCRIPTION OF THE INVENTION

Figure 1:
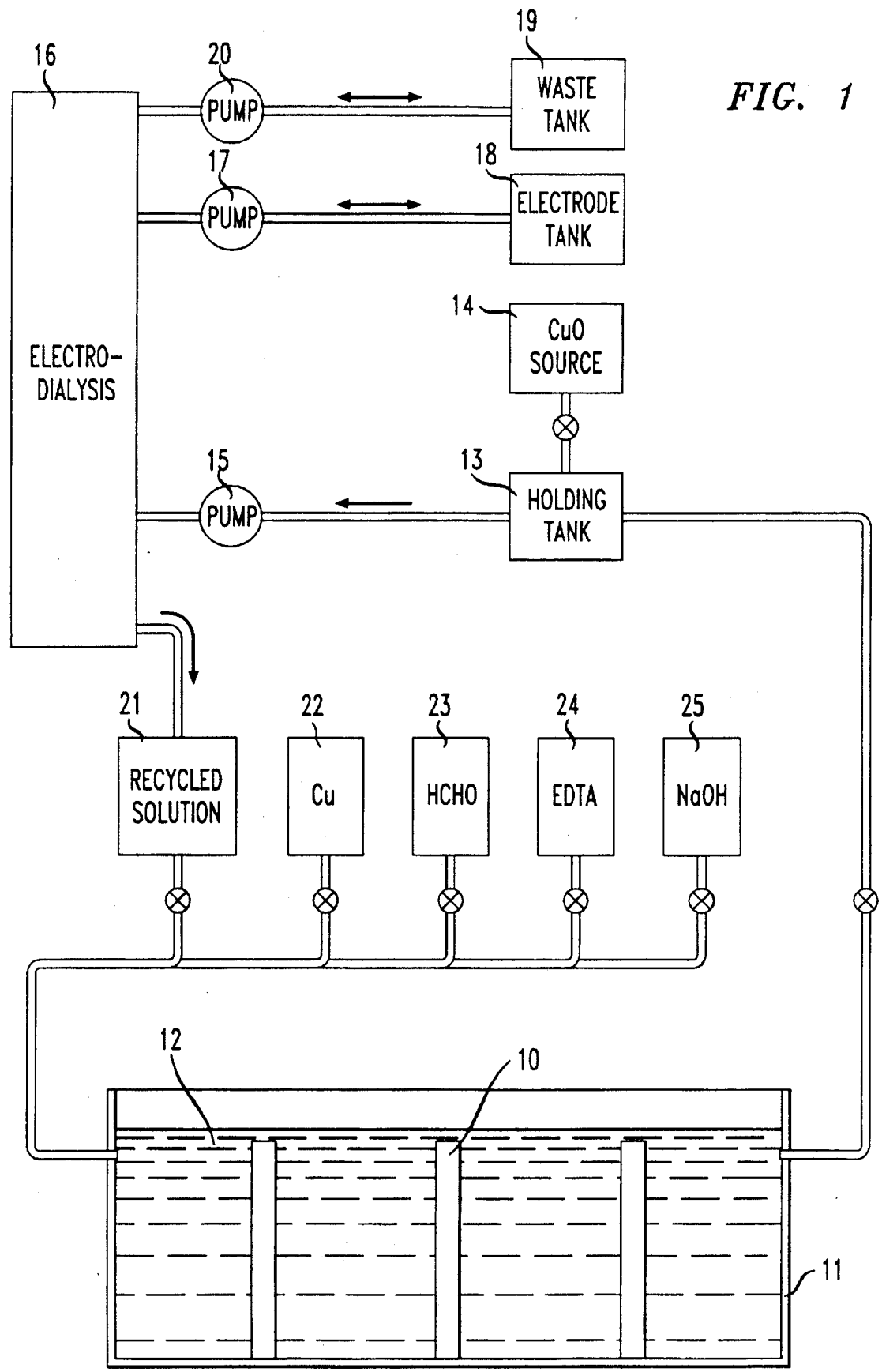
FIG. 1 is a schematic illustration of apparatus which may be used to practice the invention in accordance with one embodiment.

As illustrated in FIG. 1, electroless plating of printed circuit boards, e.g., 10, takes place in accordance with standard techniques in a plating tank, 11, containing a standard plating bath, 12. For example, the bath could comprise a mixture of a source of copper ions from tank 22, a reducing agent such as formaldehyde from tank 23, a complexing agent such as ethylenediamine tetraacetic acid (EDTA) from tank 24, and sodium hydroxide from tank 25. During plating, contaminants such as formate ions and carbonate ions accumulate in the plating tank. In addition, copper ions become depleted. In order to keep the contaminant and copper levels within prescribed limits, a portion of the bath, 12, (hereinafter the "bail") is drained or pumped into a holding tank, 13. Coupled to the holding tank, 13, is a source of copper oxide, 14.

The holding tank, 13, is coupled through a pump, 15, to an electrodialysis apparatus, 16, which will be described in more detail below with reference to FIG. 2. Also coupled to the apparatus, 16, through a pump, 17, is a tank, 18, which contains an electrode rinse solution such as a two percent sodium formate solution. A waste tank, 19, is also coupled to the apparatus, 16, through a pump, 20, in order to transport and receive a solution which includes the contaminants from the portion of the plating solution. After removal of contaminants by electrodialysis, the bail is pumped to recycled tank, 21.

Figure 2:
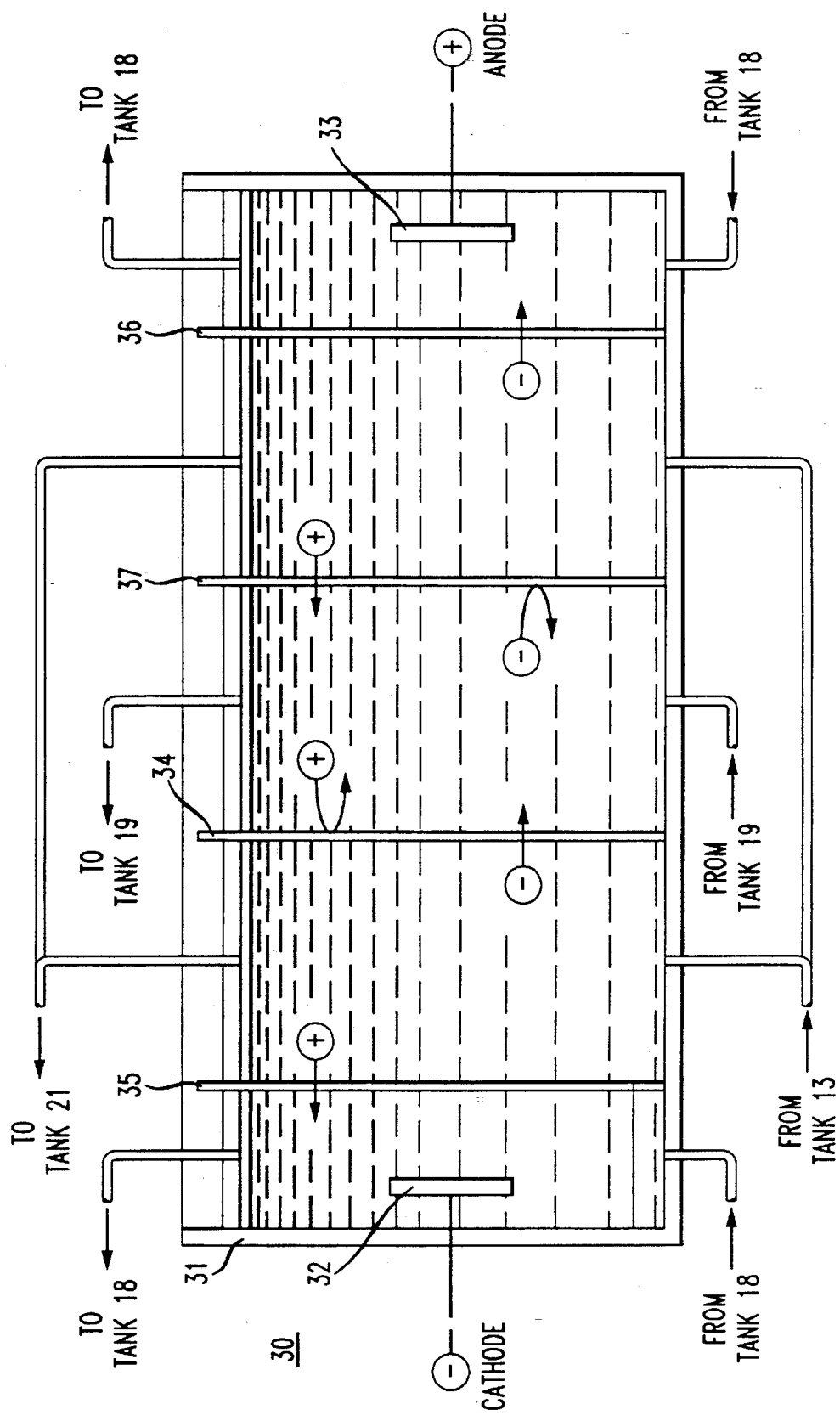
FIG. 2 is a more derailed schematic illustration of a potion of the apparatus of FIG. 1.

The basic features of an electrodialysis apparatus, 16, are illustrated schematically in FIG. 2. The actual machine employed in this example was an Electrodialyzer Model DS-O sold by Asahi Glass Company of Japan. The electrodialysis cell, 30, is basically a sealed chamber, 31, with a cathode, 32, at one end and an anode, 33, at the other end. The cathode was stainless steel and the anode was platinum-plated titanium. The anode and cathode are separated by a plurality of pairs of anion exchange membranes, e.g., 34, and cation exchange membranes, e.g., 35. While only two pairs of such membranes are illustrated, it will be appreciated that the cell typically includes several more pairs. In this example, ten pairs of membranes were utilized. The membranes were made of a styrene divinyl benzene polymer and were the type sold by Asahi Glass Company under the designation Selemion CMV and AMV membranes.

As shown, the bail from holding tank, 13, was directed into the chamber, 31, at alternate spaces between opposing membranes, i.e., between membranes 34 and 35 and membranes 36 and 37 in this example. The solution from waste tank, 19, which in this example comprises a 0.2 percent sodium formate solution, was fed into the alternate spaces between membranes not occupied by the plating solution, i.e., between membranes 34 and 37 in this example. The electrode rinse solution from tank, 18, which, in this example, comprises a 2 percent sodium formate solution, was fed into the portions of chamber 31 which include the anode, 33, and cathode, 32.

When a DC voltage was supplied to the anode and cathode, the sodium ions, represented by "+" in the figure, from the bail migrated toward the cathode, while the formate and carbonate ions, represented by "–", from the plating solution migrated toward the anode. The sodium ions passed through the cation exchange membranes, 35 and 37, but were blocked by the anion exchange membrane, 34. Similarly, the formate and carbonate ions passed through the anion exchange membranes, 34 and 36, but were blocked by the cation exchange membrane, 37. Thus, the contaminants formate and carbonate ions were separated from the bail in the chambers between membranes 34 and 35 and between membranes 36 and 37, and formed sodium formate and sodium carbonate in the chamber between membranes 34 and 37. The purified bail was then pumped into tank 21 where it was introduced back into the plating bath, 11, when desired. The solution containing the sodium formate and sodium carbonate was pumped into tank 19 where it was disposed of in public waste treatment facilities.

In a particular example, ten membrane pairs were employed, each with an effective area of approximately 0.172 square meters, a thickness of approximately 0.14 mm, and a distance between membranes of approximately 0.00075 meters. The voltage applied to the anode and cathode (cell voltage) was 7.7 volts, resulting in a voltage across all membranes (membrane voltage) of approximately 6 volts and a cell current of approximately 2 amps. The flow rate of all solutions was approximately 120 liters/hr. The temperature of the waste solution was held below 25 degrees C. by using an immersion cooling coil (not shown) in the tank 19. Dissolution of copper oxide in the holding tank, 13, was done while heating at 75 degrees C. and mechanically stirring the solution. Electrodialysis was performed until the formate concentration, which was 20–25 gm/liter, fell below 1 gm/liter.

A significant feature of the invention is the fact that copper oxide, rather than a copper salt, was used to replenish copper in the bail, since a copper salt could be environmentally hazardous. A further significant feature is that the copper oxide was added to the plating solution prior to the electrodialysis. It was discovered that when the copper oxide was added after electrodialysis, an appreciable amount of formate was formed due to the oxidation of formaldehyde and the Cannizzaro's reaction (the reaction of formaldehyde and sodium hydroxide). The presence of this formate tended to defeat the purpose of the electrodialysis.

It was found that best results were achieved with a cell current in the range 1–3 amps, a membrane voltage within the range 2–8 volts, and a cell voltage within the range of 4–8 volts. If current is too low, ion mobility will be too slow, while if the current is too high, water in the solutions will begin to break up. Further, the flow rate should be in the range 100–120 liters/hr. If the flow rate is too high, the solutions will not be within the membrane gaps for a sufficient length of time, while if the flow rate is too low, the process will take too long to be economical. The temperature of the waste solution is desirably in the range 15 to 25 degrees C. so as not to damage the membranes or adversely affect ion mobility. The pH of the bail is typically in the range 10–12.

We claim:

1. A method for deposition of copper on an insulating substrate utilizing an electroless copper plating bath in a plating tank comprising the steps of:

removing a portion of the bath from the plating tank;

adding copper oxide to the portion of the bath in order to replenish copper used up during the plating;

subsequently, transporting the portion of the bath to an electrodialysis apparatus to remove contaminants therefrom; and returning the portion of the bath to the plating tank.

2. The method according to claim 1 wherein the portion of the bath is transported to a holding tank for the addition of copper oxide.

3. The method according to claim 2 wherein the portion of the bath is transported to a second holding tank prior to being returned to the plating bath.

4. The method according to claim 1 wherein the contaminants removed comprise formate and carbonate ions.

5. The method according to claim 4 wherein a voltage within the range 2 to 8 volts is applied to the anode and cathode resulting in a cell current within the range 1–3 amps.

6. The method according to claim 1 wherein the electrodialysis apparatus comprises a chamber with an anode on one end and a cathode on an opposite end with a plurality of pairs of anion exchange membranes and cation exchange membranes therebetween, there being spaces between each membrane, and the portion of the plating bath is transported to alternate spaces between the membranes.

7. The method according to claim 6 wherein a solution for receiving the contaminants is transported to alternate spaces not occupied by the portion of the plating bath.

8. The method according to claim 7 wherein the solution for receiving the contaminants is held at a temperature within the range 15 to 25 degrees C.

9. The method according to claim 6 wherein the flow rate of the portion of the plating bath into the apparatus is within the range 100–120 liters/hr.

10. The method according to claim 1 wherein the bath comprises ethylenediamine tetraacetic acid, and the copper oxide is added to the portion of the bath while heating.

* * * * *